(12) United States Patent
Sugiura et al.

(10) Patent No.: US 11,149,832 B2
(45) Date of Patent: Oct. 19, 2021

(54) DIFFERENTIAL HYPOID GEAR, PINION GEAR, AND PAIRED HYPOID GEARS FORMED BY COMBINATION THEREOF

(71) Applicants: AICHI STEEL CORPORATION, Tokai (JP); TOYOTA JIDOSHA KABUSHIKI KAISHA, Toyota (JP)

(72) Inventors: Takayoshi Sugiura, Tokai (JP); Yuta Iwamoto, Nagoya (JP); Naoki Fukuda, Tokai (JP); Yasuhiro Fukuda, Tokai (JP); Masaaki Kondo, Nagoya (JP)

(73) Assignees: AICHI STEEL CORPORATION, Tokai (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/102,678

(22) Filed: Nov. 24, 2020

(65) Prior Publication Data

US 2021/0180671 A1    Jun. 17, 2021

(30) Foreign Application Priority Data

Dec. 13, 2019 (JP) .............................. JP2019-225800
Sep. 11, 2020 (JP) .............................. JP2020-152519

(51) Int. Cl.
*F16H 48/08* (2006.01)
*C22C 38/02* (2006.01)
(Continued)

(52) U.S. Cl.
CPC ............. *F16H 48/08* (2013.01); *C22C 38/02* (2013.01); *C22C 38/04* (2013.01); *C22C 38/06* (2013.01);
(Continued)

(58) Field of Classification Search
CPC ... F16H 48/08; F16H 2048/087; C22C 38/02; C22C 38/04; C22C 38/06; C22C 38/18; C22C 38/22; C22C 38/28; C22C 38/32
(Continued)

(56) References Cited

U.S. PATENT DOCUMENTS 10,422,015 B2 * 9/2019 Hasegawa ............... C22C 38/58
2016/0108490 A1 4/2016 Eto et al.

FOREIGN PATENT DOCUMENTS

JP 58-011764 A 1/1983
JP 61-217553 A 9/1986
(Continued)

*Primary Examiner* — Leslie A Nicholson, III
(74) *Attorney, Agent, or Firm* — Oblon, McClelland, Maier & Neustadt, L.L.P.

(57) ABSTRACT

A differential hypoid gear, a pinion gear, and paired hypoid gears formed by a combination thereof are provided. The differential hypoid gear includes a ring-shaped main body and a tooth-forming surface, and has a chemical component composition including C: 0.15-0.30 mass %, Si: 0.55-1.00 mass %, Mn: 0.50-1.20 mass %, Cr: 0.50-1.50 mass %, Al: 0.020-0.080 mass %, B: 0.0005-0.0050 mass %, Ti: 0.01-0.08 mass %, N: 0.0020-0.0100 mass %, Mo: 0.25 mass % or less, and Nb: less than 0.10 mass %, the remainder being Fe and unavoidable impurities. The chemical component composition satisfies Formulae 1 and 2. The differential hypoid gear has a metallographic structure including mainly tempered martensite. A martensite ratio at an inside of a dedendum differs between an end portion of a tooth and a central portion of the tooth within a range of 15% or less. A core hardness of the dedendum at the central portion falls within 350-500 HV.

3 Claims, 5 Drawing Sheets

(51) Int. Cl.
*C22C 38/04* (2006.01)
*C22C 38/06* (2006.01)
*C22C 38/32* (2006.01)
*C22C 38/28* (2006.01)
*C22C 38/22* (2006.01)
*C22C 38/18* (2006.01)

(52) U.S. Cl.
CPC .............. *C22C 38/18* (2013.01); *C22C 38/22* (2013.01); *C22C 38/28* (2013.01); *C22C 38/32* (2013.01); *F16H 2048/087* (2013.01)

(58) Field of Classification Search
USPC ........................................................ 475/230
See application file for complete search history.

(56) References Cited

FOREIGN PATENT DOCUMENTS

JP          09-241750 A     9/1997
WO      WO 2014/203610 A1   12/2014

* cited by examiner

DIFFERENTIAL HYPOID GEAR, PINION GEAR, AND PAIRED HYPOID GEARS FORMED BY COMBINATION THEREOF

CROSS-REFERENCE

The present application claims priorities under 35 U.S.C. § 119 to Japanese patent application No. 2019-225800, filed on Dec. 13, 2019, entitled "DIFFERENTIAL HYPOID GEAR", and Japanese patent application No. 2020-152519, filed on Sep. 11, 2020, entitled "DIFFERENTIAL HYPOID GEAR, PINION GEAR, AND PAIRED HYPOID GEARS FORMED BY COMBINATION THEREOF". The contents of these applications are incorporated herein by reference in their entirety.

TECHNICAL FIELD

The present invention relates to a differential hypoid gear, a pinion gear, and paired hypoid gears formed by a combination of the differential hypoid gear and the pinion gear.

BACKGROUND ART

A differential hypoid gear used in an automobile is a final transmission device for transmitting the output of an engine for use mainly in an FR vehicle, and undergoes high surface pressure and high bending stress due to sudden excessive input. Therefore, in a differential hypoid gear, there is a need to achieve higher strength and prevent fatigue fracture in extremely low-cycle range.

In addition, a differential hypoid gear is relatively large with a large teeth width, and acceleration and deceleration surfaces thereof are asymmetrical with each other. Thus, it is problematic that distortion by carburization tends to increase during manufacturing. In order to achieve higher strength, it is effective to strengthen grain boundaries by addition of B (boron). However, variation of tooth surface properties and deformation of tooth back surfaces increase by distortion by carburization caused by addition of B, so that appropriate control of the distortion becomes difficult. The variation of tooth face properties and the deformation of tooth back surfaces lead to an increase in NV (noise and vibration), which will become a serious problem.

As mentioned above, strengthening of grain boundaries by addition of B causes an increase in deformation by carburization, and cannot make a commitment just by itself to achieve high-quality in a relatively large-sized differential hypoid gear. On the other hand, in the case in which an improvement in internal hardness is aimed within a distortion controllable range without addition of B, sufficiently higher strength cannot be achieved.

Patent Documents 1 to 3 have the description of case-hardening steels having B added, as a prior art. However, these documents have almost no description about achievement of higher strength, and it is not clear from these documents that the distortion after carburization can be curtailed to the extent causing no trouble in practical use in a differential hypoid gear with a relatively large size.

Patent Document 4 has a description of a manufacturing method of a relatively small-sized gear such as differential side gears, pinion gears, etc., in which a boron-containing steel is subjected to quenching by high-density energy heating using high frequency induction, etc. However, the quenching by high-density energy heating cannot sufficiently increase an internal hardness, and thus this manufacturing method cannot be applied without difficulty to a differential hypoid gear for which a higher strength is strongly required and necessitates quenching to be performed on the components entirely.

PRIOR ART LITERATURE

Patent Documents

Patent Document 1
Japanese Laid-open Patent Publication S58-11764
Patent Document 2
Japanese Laid-open Patent Publication S61-217553
Patent Document 3
Japanese Laid-open Patent Publication H09-241750
Patent Document 4
WO2014/203610

SUMMARY OF THE INVENTION

Problems to be Solved by the Invention

The present disclosure has been made in view of such a background, and it is intended to provide a differential hypoid gear in which even for the purpose of achieving a higher strength, quenching in whole is performed after carburizing treatment to fully increase an internal hardness, so that a distortion is appropriately controlled so as not to largely deteriorate NV while achieving a higher strength by addition of B, and to provide a pinion gear that is appropriate for use in combination with the above-mentioned differential hypoid gear, and paired hypoid gears in which the differential hypoid gear and the pinion gear are combined together.

One aspect of the present disclosure is a differential hypoid gear including:

a ring-shaped main body; and a tooth-forming surface provided on one end surface of the ring-shaped main body in the axial direction of a center axis thereof and inclined downward as departing from the center axis, the tooth-forming surface having teeth formed thereon, wherein the differential hypoid gear has a chemical component composition comprising C: 0.15-0.30 mass %, Si: 0.55-1.00 mass %, Mn: 0.50-1.20 mass %, Cr: 0.50-1.50 mass %, Al: 0.020-0.080 mass %, B: 0.0005-0.0050 mass %, Ti: 0.01-0.08 mass %, N: 0.0020-0.0100 mass %, Mo: 0.25 mass % or less, and Nb: less than 0.10 mass %, the remainder being Fe and unavoidable impurities, the chemical component composition satisfying:

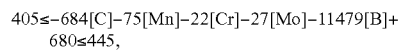

$$405 \leq -684[C]-75[Mn]-22[Cr]-27[Mo]-11479[B]+680 \leq 445, \quad \text{Formula 1:}$$

where [C], [Mn], [Cr], [Mo], and [B] indicate the contents (mass %) of C, Mn, Cr, Mo, and B, respectively; and

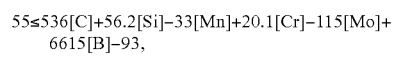

$$55 \leq 536[C]+56.2[Si]-33[Mn]+20.1[Cr]-115[Mo]+6615[B]-93, \quad \text{Formula 2:}$$

where [C], [Si], [Mn], [Cr], [Mo], and [B] indicate the contents (mass %) of C, Si, Mn, Cr, Mo, and B, respectively, the differential hypoid gear has a metallographic structure comprising mainly tempered martensite, a martensite ratio at an inside of a dedendum of each tooth differs between an end portion of the tooth and a central portion of the tooth within a range of 15% or less, and a core hardness of the dedendum at the central portion of the tooth falls within 350-500 HV.

Another aspect of the present disclosure is a pinion gear for use in combination with the differential hypoid gear according to claim 1, the pinion gear including a tooth-forming surface having teeth formed thereon; wherein the pinion gear has a chemical component composition comprising C: 0.15-0.30 mass %, Si: 0.55-1.00 mass %, Mn: 0.50-1.20 mass %, Cr: 0.50-1.50 mass %, Al: 0.020-0.080 mass %, B: 0.0005-0.0050 mass %, Ti: 0.01-0.08 mass %, N: 0.0020-0.0100 mass %, Mo: 0.25 mass % or less, and Nb: less than 0.10 mass %, the remainder being Fe and unavoidable impurities, the chemical component composition satisfying:

$$405 \le -684[C]-75[Mn]-22[Cr]-27[Mo]-11479[B]+680 \le 445, \quad \text{Formula 1:}$$

where [C], [Mn], [Cr], [Mo], and [B] indicate the contents (mass %) of C, Mn, Cr, Mo, and B, respectively; and $$55 \le 536[C]+56.2[Si]-33[Mn]+20.1[Cr]-115[Mo]+6615[B]-93, \quad \text{Formula 2:}$$

where [C], [Si], [Mn], [Cr], [Mo], and [B] indicate the contents (mass %) of C, Si, Mn, Cr, Mo, and B, respectively, the pinion gear has a metallographic structure comprising mainly tempered martensite, a martensite ratio at an inside of a dedendum of each tooth differs between an end portion of the tooth and a central portion of the tooth within a range of 15% or less, and a core hardness of the dedendum at the central portion of the tooth falls within 350-500 HV.

It has been a well-known technique to improve grain boundary strength by adding B. However, addition of B increases carburizing distortion disadvantageously, and the carburizing distortion has a remarkable influence particularly on a relatively large-sized gear such as a differential hypoid gear targeted in this disclosure, therefore a steel with no addition of B has been used. However, in such a case, an improvement in strength could not be achieved as expected, which has become a problem. Under this situation, the present inventors have made earnest studies and consequently found the cause of the increase of the carburizing distortion in the deviation of timing of transformation that is caused by the difference of temperature depending on the parts position at the time of cooling in carburization quenching. In particular, the present inventors focused on the fact that the Ms point of a carburized layer of the surface is extremely low, and attempted to optimize the components so as to minimize the timing deviation of transformation between a carburized layer and a non-carburized layer by approximating the Ms point of the non-carburized layer to the Ms point of the carburized layer.

Further, if there occurs bainite transformation rather than martensitic transformation during transformation, and a difference occurs in martensite ratio depending on the parts position, there might be an increase in carburization distortion. Therefore, the present inventors attempted to optimize the components so that a Bs point would be on long-time side.

As a result of the above-mentioned measures, the present inventors have completed the present disclosure that can fully achieve effects for improving grain boundary strength by addition of B and can achieve the effects of distortion reduction.

The differential hypoid gear has the above-specified chemical component composition that satisfies Formula 1 and Formula 2, and has the metallographic structure adjusted to have the above-specified state, so that the core hardness of the dedendum at the central portion of the tooth is enhanced to the extent within the above-specified range. On the condition that all of these indispensable requirements are fulfilled, a higher strength enabled by addition of B can be achieved and at the same time distortion caused by quenching in whole after carburizing treatment can be curtailed, so that an intended differential hypoid gear can be obtained. The technical meaning of each requirement will be described later.

The pinion gear has the above-specified chemical component composition that satisfies Formula 1 and Formula 2, and has the metallographic structure adjusted to have the above-specified state. In consequence, when the pinion gear is used in combination with the above-specified differential hypoid gear as paired hypoid gears, the paired hypoid gears can exhibit a strength and durability that are higher as compared with the previously-existing ones in cooperation with the improved properties of the differential hypoid gear.

DETAILED DESCRIPTION

Figure 1A:
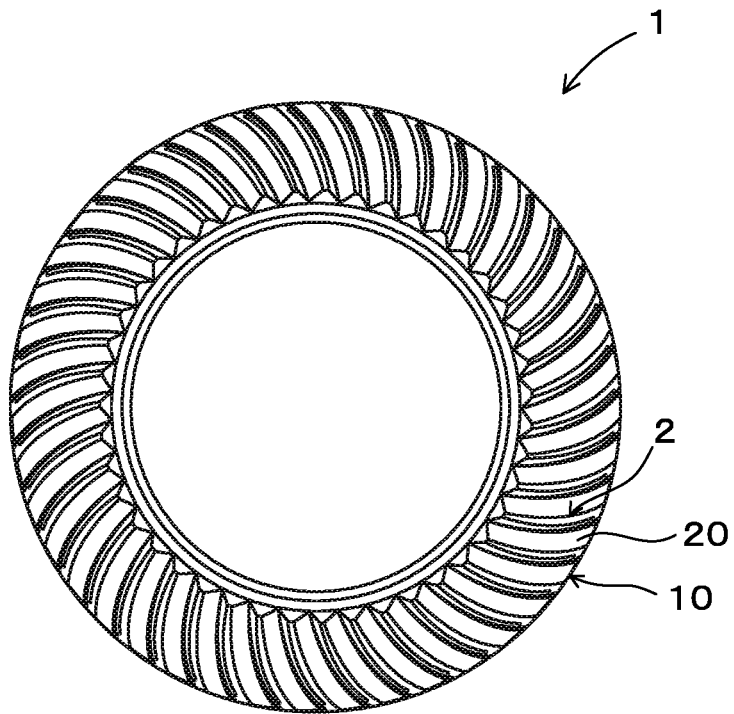
FIG. 1A is a plan view of a differential hypoid gear according to an embodiment.

The differential hypoid gear is a type of bevel gear, called a ring gear, which includes a ring-shaped main body and a tooth-forming surface provided on one end surface of the ring-shaped main body in the axial direction of a center axis thereof and inclined downward as departing from the center axis. The differential hypoid gear is a relatively large-size gear that is normally used in the state of being combined with a pinion gear.

The differential hypoid gear has the following chemical component composition. In this regard, it is noted that the unit of percentages (%) of each chemical component is "mass %".

C (Carbon): 0.15-0.30%

In order to reliably obtain a core hardness, C is contained in an amount of 0.15% or more. However, if the C content is excessively large, there is a risk that degradation in machinability and/or cold forgeability will be caused. Therefore, the C content is set to 0.30% or less.

Si (Silicon): 0.55-1.00%

In order to achieve the effect of grain boundary strengthening, Si is contained in an amount of 0.55% or more. However, if the Si content is excessively large, there is a risk that degradation in workability and/or reduction of carburizability will be caused. Therefore, the Si content is set to 1.00% or less.

Mn (Manganese): 0.50-1.20%

In order to reliably obtain a core hardness (strength), Mn is contained in an amount of 0.50% or more. However, if the Mn content is excessively large, there is a risk that degradation in machinability etc. will be caused. Therefore, the Mn content is preferably set to 1.20% or less.

Cr (Chromium): 0.50-1.50%

Cr is effective for reliably obtaining a core hardness (strength) resulting from improvement of quenchability, and thus Cr is contained in an amount of 0.50% or more for this purpose. However, if the Cr content is excessively large, there is a risk that when a carburizing treatment is performed, the amount of Cr carbides will increase and may form a starting point of fatigue fracture. Therefore, the upper limit of the Cr content is set to 1.50%.

Al (Aluminum): 0.020-0.080%

Al exists in the steel as an AlN, and has effects of curtailing coarsening of crystal grain and curtailing generation of BN by a pinning effect, and thus Al is contained in an amount of 0.020% or more for this purpose. However, if the Al content is excessively large, there is a risk that the effects will be saturated, and at the same time the amount of an aluminum-based inclusion increases, which will lead to degradation in fatigue strength. Therefore, the Al content is set to 0.080% or less.

B (Boron): 0.0005-0.0050%

In order to achieve the effects of improvement in strength such as a low-cycle strength obtained by grain boundary strengthening and improvement in quenchability, B is contained in an amount of 0.0005% or more for this purpose. However, if the B content is excessively large, there is a risk that the above-described effects will be saturated. Therefore, the upper limit of B content is set to 0.0050%.

Ti (Titanium): 0.01-0.08%

Ti is effective for refining of crystal grains, and at the same time has the effect of improvement in quenchability of B by restraint of BN generation, and thus Ti is contained in an amount of 0.01% or more for this purpose. However, if the Ti is excessively added, there is a risk that the toughness will be degraded (strength will be degraded). Therefore, the upper limit of the Ti content is set to 0.08%.

N (Nitrogen): 0.0020-0.0100%

N forms an AlN and has the effect of curtailing coarsening of crystal grain by a pinning effect, and thus N is contained in an amount of 0.0020% or more for this purpose. However, if the N content is excessively large, there is a risk that the effect will be saturated, and at the same time the workability will be degraded. Therefore, the N content is set to 0.0100% or less.

Mo (Molybdenum): 0.25% or Less (Inclusive of the Case of Mo: 0.00%)

Mo is an arbitrarily additional element that is not required to be contained positively, the content of which may be 0% except for the case of including a small amount as an impurity. Since Mo is an element that is effective for improvement of strength by its addition, it may be added in a small amount as needed. However, if the Mo content is excessively large, there may be a risk of cost increase and degradation of cutting workability. Therefore, the Mo content is limited to 0.25% or less.

Nb (Niobium): Less than 0.10% (Inclusive of the Case of Nb: 0.00%)

Nb is an arbitrarily additional element that is not required to be contained positively, however, in the case of containing Nb, the effect of refining of crystal grains can be obtained. However, if the Nb content is excessively large, there may be a risk of deterioration in carburizability. Therefore, the Nb content is limited to less than 0.10%.

Next, on the condition that the differential hypoid gear has the above-described composition, it is important to adjust the chemical components to satisfy both of the following Formula 1 and Formula 2. Namely, by optimizing the chemical components as described above to satisfy the formulae, the effects of improving grain boundary strength by addition of B can be surely obtained, and at the same time the effect of reducing the distortion so as not to largely deteriorate NV can be obtained. Detailed explanation will be shown below.

$$405 \leq -684[C] - 75[Mn] - 22[Cr] - 27[Mo] - 11479[B] + 680 \leq 445,$$ Formula 1:

(where [C], [Mn], [Cr], [Mo], and [B] indicate the contents (mass %) of C, Mn, Cr, Mo, and B, respectively)

Formula 1 is an essential requirement for curtailing generation of distortion at the time of quenching treatment after carburization by appropriately lowering a temperature of martensitic transformation (hereinafter referred to as "Ms point" as appropriate) at the inside of the gear to thereby approximate it to the Ms point at the carburized layer. In case the value of Formula 1 exceeds the upper limit (445), it becomes difficult to curtail the generation of distortion. The lower the value of Formula 1 is, the lower the Ms point of non-carburized layer inside the gear can be made. In the meantime, in case the value of Formula 1 is lower than the lower limit (405), there is a risk that the core hardness becomes excessively high. Therefore, the lower limit is set as above.

$$55 \leq 536[C] + 56.2[Si] - 33[Mn] + 20.1[Cr] - 115[Mo] + 6615[B] - 93,$$ Formula 2:

(where [C], [Si], [Mn], [Cr], [Mo], and [B] indicate the contents (mass %) of C, Si, Mn, Cr, Mo, and B, respectively)

Formula 2 is an essential requirement for curtailing the generation of distortion which is caused by the fact that the difference of a martensite ratio at the inside of the dedendum of each tooth between an end portion of the tooth and a central portion of the tooth is so large. The difference of the martensite ratio at the inside of the dedendum of the tooth between an end portion of the tooth and a central portion of the tooth cannot be sufficiently reduced only by satisfying Formula 1. Therefore, by designing the chemical components so as to satisfy not only Formula 1 but Formula 2, the difference of the martensite ratio which is caused depending on the portion of the tooth can be reduced, so that distortion due to carburizing can be curtailed more effectively.

The significances of Formula 1 and Formula 2 mentioned above are further described below.

The inventors' research has revealed the fact that distortion of a tooth face (an increase in concave amount of a tooth face) that will cause NV tends to occur in case the difference of a starting point of martensitic transformation at a tooth surface layer and at an inside of the tooth is larger. To address this issue, it is effective to approximate the Ms points of the surface layer (carburized layer) and the inside. However, an Ms point is dependent on carbon content the most, and the Ms point of the surface layer, which is a carburized layer having a high C content, cannot be easily changed. Therefore, it is necessary to lower the Ms point of the inside as low as possible so that the difference with the carburized layer is made smaller.

In the case of adding B, quenchability is controlled by setting an additive rate of C to be low in many cases.

However, there has been found the most appropriate hardness for the inside portion to achieve a higher strength, which will be described later, and thus a range of the C content has been defined to obtain the aimed core hardness. And the range of the fundamental chemical component composition as described above has been defined further considering the fact that the differential hypoid gear is relatively large-size and the viewpoint of lowering the hardness after normalizing and annealing to suppress generation of a troostite structure and to easily machine it.

In addition, it was conceived that by adjusting the content of each chemical component so as to satisfy Formula 1, the Ms point of the inside is controlled to be relatively low. It is noted that setting the value of Formula 1 to be low for the purpose of shifting the Ms point of the inside tends to heighten the C content that has the largest influence on the Ms point. When the value of Formula 1 is made low, the hardness of the inside is increased further. In the meanwhile, it has been revealed that if the hardness is excessively increased, the toughness of the inside of the component is reduced, and consequently the low-cycle strength of bending, which is an important strength property, is reduced. For this reason, the lower limit of Formula 1 is set.

The tooth width of the differential hypoid gear is relatively large, and thus there arises a difference of the inside structures (martensite ratios) between the end portion of the tooth and the central portion of the tooth, so that the distortion after carburization quenching tends to become apparent. To address this issue, the chemical components are adjusted to satisfy Formula 2. In this way, a material design is made such that a temperature of bainite transformation (hereinafter referred to as "Bs point" as appropriate) is on the long-time side (the larger the value of Formula 2 is, the more likely that the Bs point is on the long-time side). When component design is made such that the Bs point is on the long-time side, generation of bainite can be curtailed, so that variation in bainite ratio depending on the portion of the tooth can be controlled to be small. In view of the fact that the portion of which the martensite ratio is low means the portion of which the bainite ratio is high, it has been found that the difference of a martensite ratio at an inside of a dedendum between the end portion of the tooth and the central portion of the tooth can be reduced, so that distortion after performing carburization quenching can be improved.

Further, in the differential hypoid gear, the difference of a martensite ratio at the inside of a dedendum of the tooth that is formed on the tooth-forming surface between an end portion of the tooth and a central portion of the tooth is set within a range of 15% or less. It is noted that the martensite ratios are compared on the basis of the measured values of the end portion of the tooth and the central portion of the tooth both at the inside of the dedendum. The inside of the dedendum at the end portion of the tooth is defined as a portion that is located on the cut surface appearing when the tooth is cut off along the plane passing through the vicinity of the dedendum, and is located inside from the carburized layer near the inner peripheral end surface of the differential hypoid gear. The inside of dedendum at the central portion of the tooth is defined as a portion that is located on the abovementioned cut surface, and is located in between the inner peripheral end surface and the outer peripheral end surface of the differential hypoid gear. Measurement of a martensite ratio is performed by the method as described in the later-described embodiment in concrete terms.

With regard to the martensite ratio, it is necessary that the martensite ratio at an inside of a dedendum of the tooth that is formed on the tooth-forming surface differs between an end portion of the tooth and a central portion of the tooth within a range of 15% or less. By satisfying this requirement, generation of the distortion after carburization quenching can be curtailed, and eventually variation of tooth surface properties and deformation in shape of a tooth back surface can be curtailed.

The distortion generated after carburization quenching becomes remarkable as a module (the size of a tooth) becomes larger. In particular, in the case in which the module is 3 or more, it becomes difficult to control the distortion within an aimed range without any measure to satisfy Formula 1 and Formula 2. As described above, by optimizing the chemical components as defined in Formula 1 and Formula 2, it becomes possible even for the differential hypoid gear as a relatively large-sized gear component to obtain the effect of preventing large degradation of NV while enhancing the strength by addition of B.

The internal structure of the differential hypoid gear is required to have a metallographic structure comprising mainly tempered martensite. In other words, it is necessary to perform a quenching treatment after carburizing to thereby obtain the metallographic structure comprising mainly martensite, and then to perform tempering at a temperature of approximately 100-200° C. to thereby form the metallographic structure comprising mainly tempered martensite.

Here, in the metallographic structure comprising mainly tempered martensite, tempered martensite occupies at least 80% or more of the structure in terms of an area ratio, and bainite is allowed to be partly mixed therein. The lower area ratio of bainite is more preferable. It is noted that cooling is preferably performed at the rate of 7.5° C./second or more in the temperature range of 400-500° C. in order to form the metallographic structure comprising mainly martensite after performing carburization quenching. In the present disclosure, because component design is made such that a Bs point is on the long-time side as mentioned above, generation of bainite can be curtailed as much as possible when the steel having the chemical component composition of the above-described range is quenched, and a generation ratio of martensite can be raised.

Further, in the differential hypoid gear, it is necessary that a core hardness of the dedendum at the central portion of the tooth falls within the range of 350-500 HV. In case the core hardness of the dedendum at the central portion of the tooth is less than 350 HV, there is a risk that an aimed low-cycle strength will not be achieved. On the other hand, in case the core hardness exceeds 500 HV, there is a risk that toughness will be reduced, and which facilitates the growth of a crack, and that the low-cycle strength will be rather reduced.

Next, the chemical components of the pinion gear is configured to have a chemical component composition that includes C: 0.15-0.30 mass %, Si: 0.55-1.00 mass %, Mn: 0.50-1.20 mass %, Cr: 0.50-1.50 mass %, Al: 0.020-0.080 mass %, B: 0.0005-0.0050 mass %, Ti: 0.01-0.08 mass %, N: 0.0020-0.0100 mass %, Mo: 0.25 mass % or less, and Nb: less than 0.10 mass %, the remainder being Fe and unavoidable impurities. Furthermore, it is necessary for the chemical component composition to satisfy Formula 1: $405 \leq -684[C]-75[Mn]-22[Cr]-27[Mo]-11479[B]+680 \leq 445$, where [C], [Mn], [Cr], [Mo], and [B] indicate the contents (mass %) of C, Mn, Cr, Mo, and B, respectively; and Formula 2: $55 \leq 536[C]+56.2[Si]-33[Mn]+20.1[Cr]-115[Mo]+6615[B]-93$, where [C], [Si], [Mn], [Cr], [Mo], and [B] indicate the contents (mass %) of C, Si, Mn, Cr, Mo, and B, respectively.

Furthermore, it is necessary that the pinion gear has a metallographic structure including mainly tempered martensite, a martensite ratio at an inside of a dedendum of each tooth that is formed on a tooth-forming surface differs between an end portion of the tooth and a central portion of the tooth within a range of 15% or less, and a core hardness of the dedendum at the central portion of the tooth falls within 350-500 HV.

The pinion gear is formed to have the same range of chemical components, the same structure, and the same range of hardness as those of the differential hypoid gear. Therefore, when the pinion gear is used as paired hypoid gears in combination with the differential hypoid gear having the improved properties as described above, it can contribute to significantly improve the strength and durability of the paired hypoid gear in comparison with the case of using a pinion gear formed of a previously-existing steel. It is noted that although the range of the chemical component composition of the pinion gear is set to the same range as in the differential hypoid gear, it is not necessary for the pinion gear to have the exactly same chemical components, etc. Whenever the chemical component compositions, structure, and hardness in both of the differential hypoid gear and the pinion gear fall within the same range as specified above, excellent strength and durability can be obtained even if the differential hypoid gear and the pinion gear are not completely consistent with each other with respect to the actual chemical components, structure, and hardness.

EMBODIMENT

Embodiment 1

An embodiment of the differential hypoid gear will be described below.

In this embodiment, differential hypoid gears for test were prepared using 23 kinds of steel materials (Steel Grades 1-23) differed in chemical composition as shown in Table 1. Also, to evaluate a low-cycle strength, test pieces for a three-point bending test regarded as differential hypoid gears were prepared and evaluated. It is noted that among the steel materials shown in Table 1, Steel Grade 1-11 are steels that satisfy the requirements of chemical components in the present disclosure, and Steel Grade 12-23 are steels that satisfy not all of the requirements in the present disclosure. P and S were not positively added, therefore the analytical values as impurities were shown. With respect to the steels containing Mo of which the content was 0.01% or less and the steels containing Nb of which the content was 0.00%, the analytical values as impurities were shown.

TABLE 1

| Steel Grade No. | Chemical Components (mass %) | | | | | | | | | | | | |
|---|---|---|---|---|---|---|---|---|---|---|---|---|---|
| | C | Si | Mn | P | S | Cr | Mo | B | Nb | Ti | N | Al | Fe |
| 1 | 0.21 | 0.80 | 0.77 | 0.015 | 0.018 | 1.14 | 0.01 | 0.0020 | 0.01 | 0.03 | 0.0037 | 0.038 | bal. |
| 2 | 0.21 | 0.82 | 0.62 | 0.016 | 0.014 | 1.15 | 0.16 | 0.0019 | 0.03 | 0.07 | 0.0080 | 0.035 | bal. |
| 3 | 0.20 | 0.85 | 0.62 | 0.016 | 0.014 | 1.20 | 0.16 | 0.0019 | 0.05 | 0.03 | 0.0045 | 0.035 | bal. |
| 4 | 0.27 | 0.65 | 0.50 | 0.016 | 0.014 | 1.01 | 0.07 | 0.0019 | 0.00 | 0.03 | 0.0045 | 0.035 | bal. |
| 5 | 0.20 | 0.55 | 0.55 | 0.018 | 0.020 | 1.40 | 0.00 | 0.0030 | 0.09 | 0.01 | 0.0029 | 0.040 | bal. |
| 6 | 0.18 | 0.95 | 0.93 | 0.019 | 0.024 | 1.45 | 0.20 | 0.0037 | 0.03 | 0.04 | 0.0070 | 0.025 | bal. |
| 7 | 0.25 | 0.70 | 0.80 | 0.015 | 0.015 | 0.70 | 0.10 | 0.0015 | 0.00 | 0.06 | 0.0051 | 0.034 | bal. |
| 8 | 0.23 | 0.75 | 0.50 | 0.014 | 0.016 | 0.80 | 0.07 | 0.0019 | 0.00 | 0.02 | 0.0052 | 0.027 | bal. |
| 9 | 0.17 | 1.00 | 1.10 | 0.011 | 0.019 | 0.51 | 0.03 | 0.0050 | 0.08 | 0.07 | 0.0180 | 0.070 | bal. |
| 10 | 0.21 | 0.80 | 0.77 | 0.015 | 0.018 | 1.14 | 0.01 | 0.0020 | 0.01 | 0.03 | 0.0037 | 0.038 | bal. |
| 11 | 0.21 | 0.80 | 0.77 | 0.015 | 0.018 | 1.14 | 0.01 | 0.0020 | 0.01 | 0.03 | 0.0037 | 0.038 | bal. |
| 12 | 0.16 | 0.80 | 0.78 | 0.015 | 0.015 | 1.21 | 0.16 | 0.0020 | 0.01 | 0.03 | 0.0040 | 0.032 | bal. |
| 13 | 0.21 | 0.62 | 0.61 | 0.018 | 0.013 | 0.66 | 0.05 | 0.0016 | 0.02 | 0.02 | 0.0032 | 0.031 | bal. |
| 14 | 0.17 | 0.60 | 0.80 | 0.015 | 0.016 | 1.20 | 0.09 | 0.0033 | 0.00 | 0.04 | 0.0049 | 0.028 | bal. |
| 15 | 0.21 | 0.52 | 1.15 | 0.014 | 0.014 | 0.53 | 0.03 | 0.0028 | 0.01 | 0.06 | 0.0055 | 0.029 | bal. |
| 16 | 0.23 | 0.70 | 0.63 | 0.015 | 0.017 | 0.60 | 0.21 | 0.0024 | 0.01 | 0.06 | 0.0055 | 0.038 | bal. |
| 17 | 0.27 | 0.84 | 0.90 | 0.015 | 0.018 | 1.49 | 0.15 | 0.0023 | 0.03 | 0.03 | 0.0040 | 0.033 | bal. |
| 18 | 0.25 | 0.81 | 0.78 | 0.014 | 0.015 | 0.98 | 0.21 | 0.0024 | 0.05 | 0.05 | 0.0053 | 0.031 | bal. |
| 19 | 0.18 | 0.90 | 0.59 | 0.015 | 0.018 | 1.38 | 0.14 | 0.0022 | 0.02 | 0.03 | 0.0038 | 0.036 | bal. |
| 20 | 0.21 | 0.64 | 0.52 | 0.016 | 0.015 | 0.76 | 0.02 | 0.0029 | 0.00 | 0.02 | 0.0045 | 0.036 | bal. |
| 21 | 0.13 | 0.90 | 0.91 | 0.015 | 0.019 | 1.48 | 0.01 | 0.0047 | 0.01 | 0.03 | 0.0050 | 0.034 | bal. |
| 22 | 0.17 | 0.53 | 0.68 | 0.015 | 0.019 | 1.20 | 0.01 | 0.0043 | 0.01 | 0.03 | 0.0050 | 0.034 | bal. |
| 23 | 0.25 | 0.80 | 0.87 | 0.015 | 0.018 | 1.20 | 0.01 | 0.0003 | 0.01 | 0.03 | 0.0037 | 0.038 | bal. |

Figure 1B:
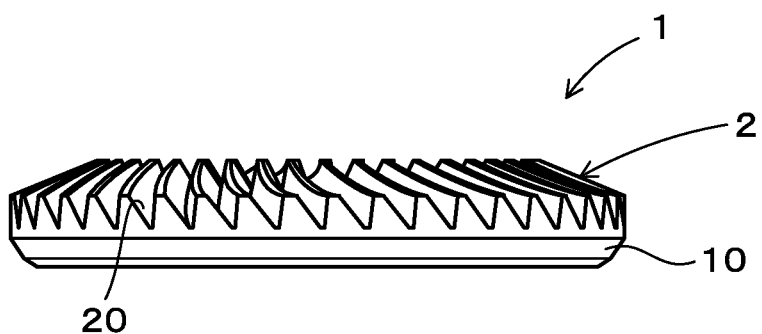
FIG. 1B is an elevation view of the differential hypoid gear.

A differential hypoid gear 1 for test was prepared in the following manner. A cast piece prepared by melting in an electric furnace was subjected to forging to form into the shape of a gear, and then sequentially subjected to annealing, crude processing, carburizing heat treatment, and finish machining so as to have a shape as shown in FIG. 1A and FIG. 1B. The differential hypoid gear 1 includes, as shown in FIG. 1A and FIG. 1B, a ring-shaped main body 10 and a tooth-forming surface 2 provided on one end surface of the ring-shaped main body 10 in the axial direction of a center axis thereof and inclined downward as departing from the center axis. The tooth-forming surface 2 has a plurality of teeth 20 erected therefrom in such a manner to have a predetermined module. In this embodiment, three kinds of teeth the module of which are 3.99, 4.84, and 6.01, respectively were prepared.

Figure 2:
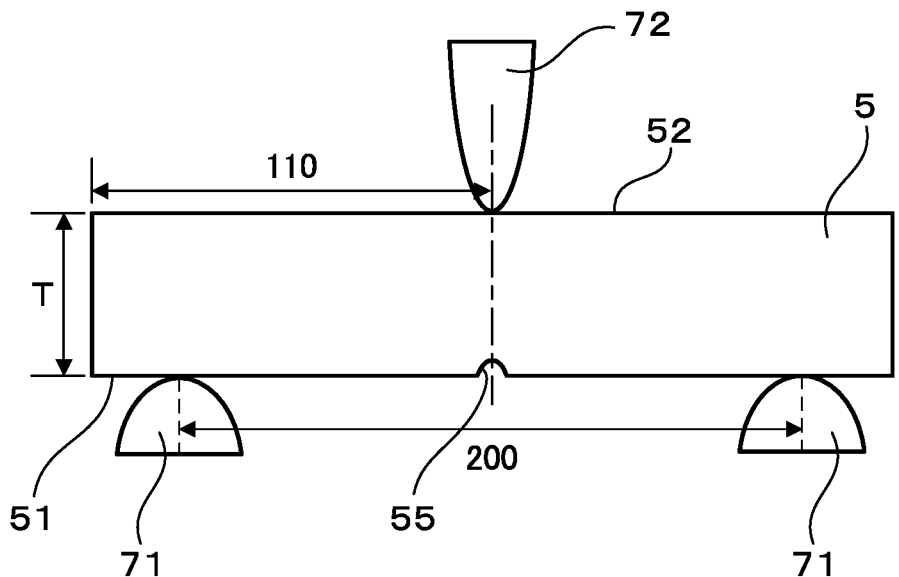
FIG. 2 is an illustration that shows a test procedure for a three-point bending test in the embodiment.
Figure 3:
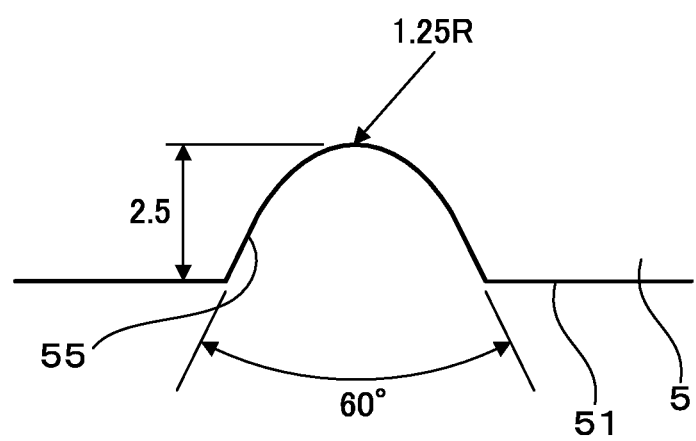
FIG. 3 is an illustration that shows a shape of a notch provided on a test piece for the three-point bending test in the embodiment.

A test piece 5 for strength evaluation, as shown in FIG. 2 and FIG. 3, is for use in a three-point bending test that will be described later. The test piece 5 was prepared in the following manner. A cast piece prepared by melting in an electric furnace was subjected to extend forging to thereby form a bar steel, and then the bar steel was sequentially subjected to annealing, crude processing, carburizing heat treatment, and finish machining including 0.2 mm grinding and notching work to thereby prepare a square rod of Tmm square section. Specifically, three type of test pieces 5, i.e. a test piece 5 having a size of 18 mm×18 mm×220 mm which is worth the module of 3.99, a test piece 5 having a size of 25 mm×25 mm×220 mm which is worth the module of 4.84, and a test piece 5 having a size of 30 mm×30 mm×220 mm which is worth the module of 6.01 were prepared. The reason why the sizes of the three pieces were set differently is for the purpose of adjusting the cooling rate at the time of quenching to the same level in view of the fact that the cooling rate in quenching depends on the gear size, and the variation of the cooling rate has an influence on the structure, accordingly. In all of the test pieces 5, a notch 55 is formed, as shown in FIG. 2 and FIG. 3 to have a round bottom at the center of each piece with an opening angle of 60° and a depth of 2.5 mm.

In the carburizing heat treatment, a differential hypoid gear or a test piece that has undergone a crude processing was subjected to, through a preheating process to keep the temperature at 930° C. for 30 minutes, a carburizing period to keep the temperature at 950° C. for 75 minutes, a diffusion period to keep the temperature at 950° C. for 75 minutes, and a soaking process to keep the temperature at 850° C. for 30 minutes, a quenching process in which rapid cooling was performed by immersing in an oil of 130° C. such that the cool rate is controlled to be 7.5° C./second or more at least in the temperature range of 400–500° C., and then a tempering process to keep the temperature at 150° C. for 60 minutes.

For the resulted differential hypoid gear 1 for test, a deformation amount of crowning, a deformation amount of back face, and a difference of a martensite ratio at the inside of a dedendum between an end portion of the tooth and a central portion of the tooth were measured with respect to the shape of the tooth face, and the state of an internal metallographic structure was observed. For the test piece, a strength evaluation was performed by a three-point bending test. The conditions for each evaluation etc. are described below.

<Deformation Amount of Crowning>

Figure 4:
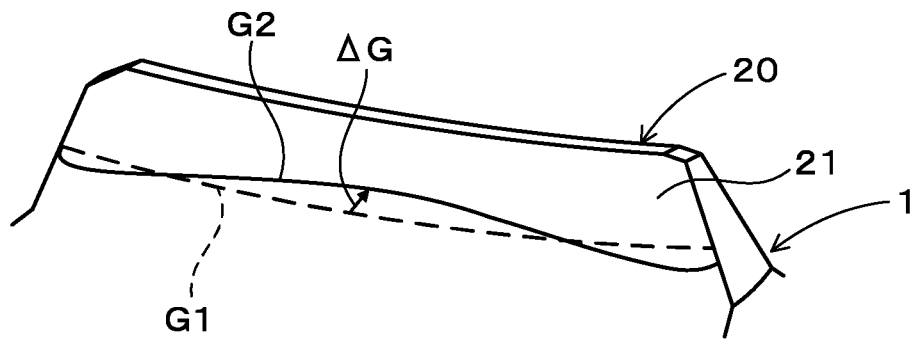
FIG. 4 is an illustration that shows a measurement position for measurement of a deformation amount of crowning at a tooth face in the embodiment.

As shown in FIG. 4, with respect to a design shape G1 of a pitch point position in a tooth face 21 of a tooth 20 of the differential hypoid gear 1, an actually formed shape G2 was out of alignment therefrom by a shift length ΔG. The shift length ΔG was measured. Setting the shift length in Steel Grade 23, in which B is contained at the level of unavoidable impurities and not contained as an essential component, as a basis for measurement (1.00), the ratio of the shift length ΔG with respect to the shift length in Steel Grade 23 was calculated as the deformation amount of crowning. Cases in which the ratio to the basis was ranged to 1.25 were judged to be acceptable.

<Deformation Amount of Back Face>

Figure 5:
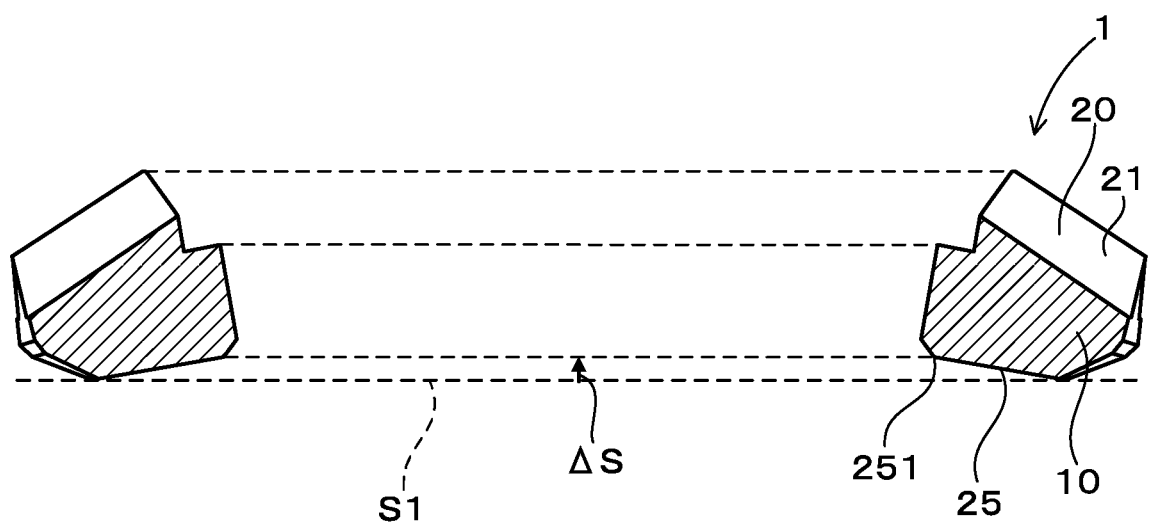
FIG. 5 is an illustration that shows a measurement position for measurement of a deformation amount of a back face in the embodiment.

As shown in FIG. 5, the differential hypoid gear 1 is designed such that a back-side flat surface part 25 opposite in the axial direction to a tooth face 21 is positioned on a single plane (a plane Si), however, the inner peripheral side tends to deform toward the side of the tooth face 21 after carburization quenching. In this embodiment, the deformation amount of a back face was defined by a shift length ΔS measured as the shift length of an inner peripheral end 251 of the back-side flat surface part 25 from the plane S1 in design. The shift length was measured at four points equally spaced in the entire circumference of the differential hypoid gear 1, and the average value of the measured results at the four points was used for evaluation. Setting the shift length in Steel grade 23 as a basis for measurement (1.00), the ratio of the shift length Δ S with respect to the shift length in Steel Grade 23 was calculated as the deformation amount of back face. Cases in which the ratio to the basis was less than 3.00 were judged to be acceptable (○), and cases in which the ratio to the basis was 3.00 or more were judged to be unacceptable (x).

<Difference of Martensite Ratio>

Figure 6:
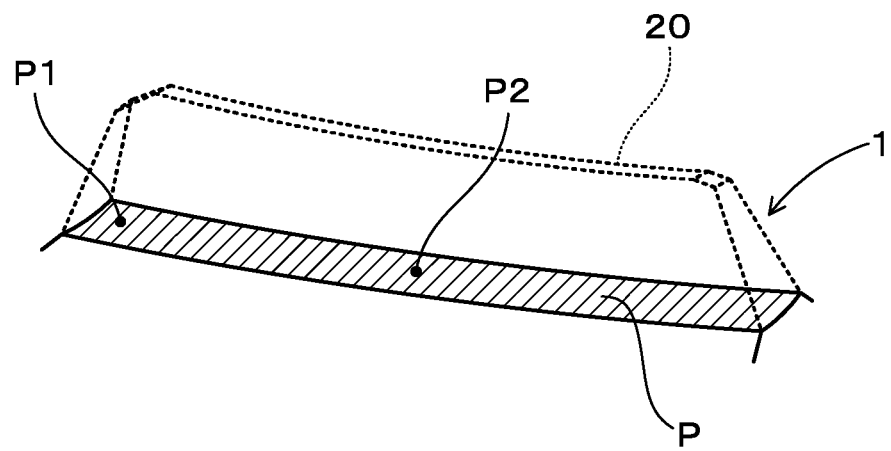
FIG. 6 is an illustration that shows a measurement position for measurement of a difference of a martensite ratio in the embodiment.

Measurement of a martensite (tempered martensite) ratio was performed at a tooth end portion P1 and a tooth central portion P2 on a cut surface P that was formed by cutting off the tooth along the surface passing through the dedendum, as shown in FIG. 6. The tooth end portion P1 was set to be located inside from the carburized layer near the inner peripheral end surface. The tooth central portion P2 was set to be located in between the inner peripheral end surface and the outer peripheral end surface on the cut surface P.

Measurement of a martensite ratio was performed using a photograph taken through an optical microscope, of the cut surface P that had been ground and corroded with nital. Specifically, straight lines equally spaced were drawn on the photograph lengthwise and crosswise in a lattice form (ten lines lengthwise, ten lines crosswise), and each structure at 100 lattice points was observed to calculate the ratio of the lattice points at which a martensite structure (tempered martensite) was found, as a martensite ratio. Cases in which the martensite ratios thus obtained differed in the range of 15% or less were judged to be acceptable, and cases in which the martensite ratios differed in the range of 16% or more were judged to be unacceptable.

<Core Hardness of Dedendum>

As for a core hardness of the dedendum, measurement was performed on the central tooth portion P2 on the cut surface P shown in FIG. 6. Cases in which the core hardness of the dedendum at the central tooth portion was ranged from 350 HV to 500 HV were judged to be accepted, and cases in which the core hardness was outside this range were judged to be unaccepted.

<Observation of Internal Metallographic Structure State>

In addition to the measurement of the martensite ratio as mentioned above, an area ratio of bainite was measured. Specifically, the measurement was performed using a photograph taken through an optical microscope, of the cut surface P that had been ground and corroded with nital. Straight lines equally spaced were drawn on the photograph lengthwise and crosswise in a lattice form (ten lines lengthwise, ten lines crosswise), and observation was made on the structure at 100 lattice points to calculate an area ratio of bainite from the ratio of the lattice points at which a bainite structure was found. In case the area ratio of bainite was 20% or less, the area ratio of martensite (tempered martensite) was determined to be 80% or more. All of Steel Grades 1-11 among the steel grades prepared this time, which satisfy the requirements of the present disclosure, were confirmed to have an area ratio of bainite in the range of 20% or less, and to have a metallographic structure comprising mainly a tempered martensite.

<Three-Point Bending Test>

To evaluate the strength of the differential hypoid gear 1, a three-point bending test was performed using the above-mentioned test piece 5. As shown in FIG. 2, a notch forming surface 51 having a notch 55 formed thereon was placed on two fulcrums 71 that were arranged apart from each other by 200 mm, and an upper surface 52 of the test piece 5 were pressed at the opposed position to the notch 55 by an indenter 72 to thereby apply a bending stress to the test piece 5. Then, experimental tests were performed under a plurality of conditions at various stress values set by changing a pressing force to determine a bending stress at the time of ending the lifetime of the test piece 5 in one hundred times pressings. Each bending stress thus determined was listed in Table 2. Cases in which the strength value thus determined were 1200 MPa or more were judged to be acceptable, and cases in which the strength value were less than 1200 MPa were judged to be unacceptable. It is noted that the low-cycle bending strength mentioned herein will be hereinafter referred to as a strength for short.

It is noted that the stress value for use in evaluation was the value of a bending stress at the bottom surface of the notch, which was obtained from the section modulus calculated in consideration of the shape of the notch. The section modulus mentioned here means the section modulus of the square cross section the length of which was obtained by subtracting 2.5 mm of a notch depth (see FIG. 3) from the height T of the test piece 5.

The results of all evaluation as mentioned above are shown in Table 2. Cases in which all of the evaluation results were judged to be accepted are shown to be accepted (○) as a comprehensive evaluation, meanwhile cases in which unaccepted evaluation was included in even one evaluation item are shown to be unaccepted (x) as a comprehensive evaluation.

ratio at the inside of the tooth between the end portion of the tooth and the central portion of the tooth was large. Consequently, a deformation amount of crowning, a deformation amount of back face, and a strength were all judged to be unaccepted.

With regard to Steel Grades 14-16, the essential chemical component composition falls within the intended range. However, in these steel grades, Formula 1 is satisfied, but Formula 2 is not satisfied. For this reason, the core hardness was low, and the difference of the martensite ratio at the inside of the tooth between the end portion of the tooth and the central portion of the tooth was large. Consequently, a deformation amount of back face and a strength were judged to be unaccepted.

With regard to Steel Grades 17 and 18, the value of Formula 1 was too small exceeding the lower limit although the essential chemical component composition falls within the intended range. For this reason, the internal hardness was too high, which resulted in inferior strength.

With regard to Steel Grades 19 and 20, the value of Formula 1 exceeds the upper limit although the essential

TABLE 2

| Steel Grade No. | Gear Module | Formula 1 | Formula 2 | Dedendum Hardness HV | Evaluation Results | | | | |
|---|---|---|---|---|---|---|---|---|---|
| | | | | | Difference of Martensite Ratio between Tooth End Portion and Tooth Central Portion | Deformation Amount of Crowning | Deformation of Back Face | Strength MPa | Comprehensive Evaluation |
| 1 | 4.84 | 432 | 73 | 391 | 11 | 1.12 | ○ | 1458 | ○ |
| 2 | 4.84 | 440 | 61 | 407 | 8 | 1.15 | ○ | 1514 | ○ |
| 3 | 4.84 | 444 | 60 | 407 | 11 | 1.18 | ○ | 1560 | ○ |
| 4 | 4.84 | 412 | 97 | 419 | 14 | 1.03 | ○ | 1517 | ○ |
| 5 | 4.84 | 437 | 75 | 371 | 13 | 1.18 | ○ | 1419 | ○ |
| 6 | 4.84 | 407 | 57 | 445 | 7 | 1.22 | ○ | 1546 | ○ |
| 7 | 4.84 | 414 | 66 | 440 | 7 | 0.97 | ○ | 1475 | ○ |
| 8 | 4.84 | 444 | 77 | 361 | 12 | 1.01 | ○ | 1501 | ○ |
| 9 | 4.84 | 412 | 58 | 355 | 13 | 1.21 | ○ | 1401 | ○ |
| 10 | 3.99 | 432 | 73 | 431 | 9 | 1.09 | ○ | 1592 | ○ |
| 11 | 6.01 | 432 | 73 | 380 | 13 | 1.23 | ○ | 1403 | ○ |
| 12 | 4.84 | 458 | 31 | 343 | 19 | 1.31 | x | 1149 | x |
| 13 | 4.84 | 456 | 52 | 302 | 26 | 1.34 | x | 981 | x |
| 14 | 4.84 | 437 | 41 | 341 | 17 | 1.16 | x | 1169 | x |
| 15 | 4.84 | 409 | 34 | 347 | 16 | 1.11 | x | 1158 | x |
| 16 | 4.84 | 430 | 52 | 345 | 20 | 1.08 | x | 1023 | x |
| 17 | 4.84 | 365 | 97 | 515 | 9 | 1.01 | ○ | 1188 | x |
| 18 | 4.84 | 396 | 72 | 502 | 7 | 1.03 | ○ | 1190 | x |
| 19 | 4.84 | 453 | 61 | 404 | 10 | 1.29 | ○ | 1508 | x |
| 20 | 4.84 | 447 | 71 | 358 | 12 | 1.28 | ○ | 1313 | x |
| 21 | 4.84 | 436 | 57 | 315 | 12 | 1.14 | ○ | 1001 | x |
| 22 | 4.84 | 437 | 57 | 403 | 13 | 1.13 | ○ | 1174 | x |
| 23 | 4.84 | 414 | 82 | 455 | 10 | 1.00 | ○ | 1089 | x |

As seen from Table 1 and Table 2, Steel Grade 1-11 that satisfy the requirements of the present disclosure are judged to be accepted in all of the evaluation items including strength, crowning and deformation of the tooth face, from which it can be understood that generation of the distortion due to quenching in whole after carburizing can be successfully curtailed while achieving a higher strength by addition of B.

On the other hand, with regard to Steel Grades 12 and 13, the value of Formula 1 exceeds the upper limit although the essential chemical component composition falls within the intended range. For this reason, it was difficult to curtail generation of distortion, and the core hardness could not increase. In addition, these steel grades do not satisfy Formula 2, and therefore the difference of the martensite chemical component composition falls within the intended range. For this reason, it was difficult to curtail the deformation, and these steel grades were judged to be unacceptable in respect of deformation amount of crowning, consequently.

With regard to Steel Grade 21, the additive rate of C (carbon) in the essential chemical component composition is too low. For this reason, the core hardness was too low, and the strength was also low, consequently.

With regard to Steel Grade 22, the additive rate of Si (silicon) in the essential chemical component composition is too low. For this reason, the effects for improving grain boundary strength was small, and thus the strength became low, consequently.

With regard to Steel Grade 23, the additive rate of B (boron) in the essential chemical component composition is too low. For this reason, the effects of grain boundary strengthening were not obtained sufficiently, and consequently the strength was low although there was no problem in distortion.

Figure 7:
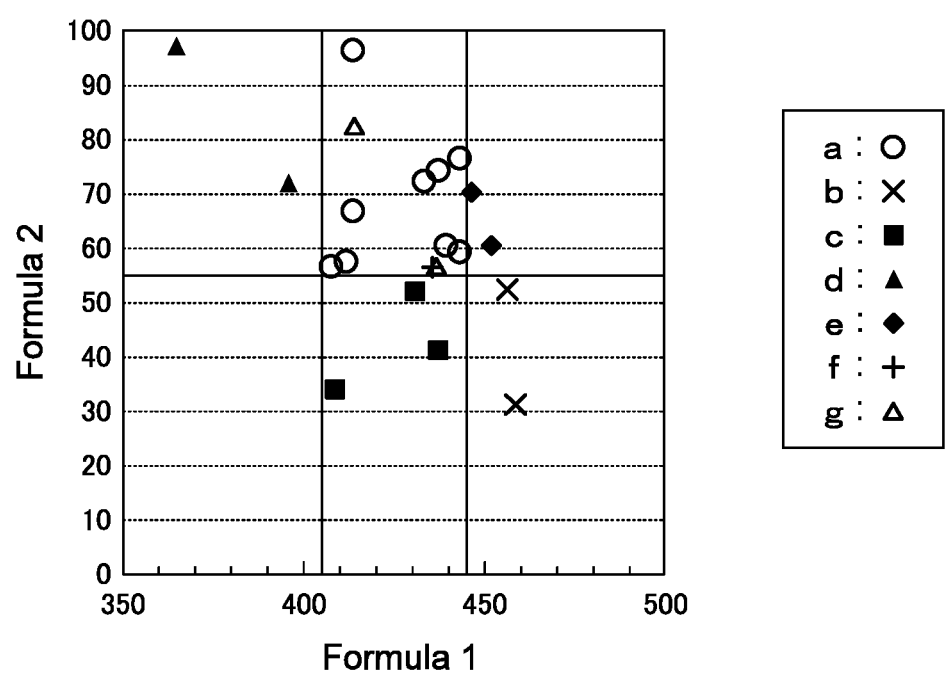
FIG. 7 is an illustration that shows the effectiveness of satisfying Formula 1 and Formula 2.

In FIG. 7, with respect to Steel Grades 1-23, the value of Formula 1 is plotted on the abscissa axis, and the value of Formula 2 is plotted on the ordinate axis. The plotted marks distinguishably show the evaluation results respectively, which are ranked into seven categories depending on the level of acceptable or unacceptable in each evaluation item. Each categorized rank will be explained as below.

(1) The steel grades that were judged to be acceptable in terms of all of the four evaluation items, i.e. a deformation amount of crowning, deformation of back face, a hardness of dedendum, and a strength are assigned with "a", (2) the steel grades that were judged to be unacceptable in terms of all of the four evaluation items, i.e. a deformation amount of crowning, deformation of back face, a hardness of dedendum (too low), and a strength are assigned with "b", (3) the steel grades that were judged to be acceptable in terms of a deformation amount of crowning, but were judged to be unacceptable in terms of deformation of back face, a hardness of dedendum (too low), and a strength are assigned with "c", (4) the steel grades that were judged to be acceptable in terms of a deformation amount of crowning and deformation of back face, but were judged to be unacceptable in terms of a hardness of dedendum (too high) and a strength are assigned with "d", (5) the steel grades that were judged to be unacceptable in terms of a deformation amount of crowning, but were judged to be acceptable in terms of deformation of back face, a hardness of dedendum, and a strength are assigned with "e", (6) the steel grades the C content of which was too small, and which were judged to be acceptable in terms of a deformation amount of crowning and deformation of back face, but were judged to be unacceptable in terms of a hardness of dedendum (too low) and a strength are assigned with "f", (7) the steel grades the Si or B content of which was too small, and which were judged to be acceptable in terms of a deformation amount of crowning, deformation of back face, and a hardness of dedendum, but were judged to be unacceptable in terms of a strength are assigned with "g".

As can be seen from FIG. 7, it has been clarified that an excellent differential hypoid gear that is acceptable in terms of all of the four evaluation items, i.e. a deformation amount of crowning, deformation of back face, a hardness of dedendum, and a strength can be obtained for the first time by satisfying the essential chemical component composition as described above, and at the same time satisfying Formula 1 and Formula 2.

Embodiment 2

In this embodiment, a pinion gear to be combined with the differential hypoid gear was prepared, and was subjected to evaluation as paired hypoid gears to assess the properties thereof. Specifically, the differential hypoid gear and the pinion gear were prepared using previously-existing steels, Steel Grades 24 and 25 which are shown in Table 3, and a test was performed on the paired hypoid gears.

It is noted that Steel Grade 24 is one type of a previously-existing steel, SCM420 in accordance with JIS G 4053, which contains an upper limit amount of C, and Steel Grade 25 is JIS SCM425, which contains C and Mo in a slightly increased amount to enhance the core hardness to thereby improve the strength.

TABLE 3

| Steel Grade No. | Chemical Components (mass %) | | | | | | | | | |
|---|---|---|---|---|---|---|---|---|---|---|
| | C | Si | Mn | Cr | Mo | N | P | S | Al | Fe |
| 24 | 0.23 | 0.24 | 0.81 | 1.12 | 0.16 | 0.0124 | 0.023 | 0.020 | 0.033 | bal. |
| 25 | 0.25 | 0.24 | 0.79 | 1.14 | 0.23 | 0.0130 | 0.017 | 0.019 | 0.032 | bal. |

In this embodiment, a ring-shaped differential hypoid gear (hereinafter referred to as a ring gear as appropriate) that is identical in shape to the ring-shaped differential hypoid gear 1 of Embodiment 1 shown in FIGS. 1A and 1B, the module of which is 4.84, was prepared using above-mentioned Steel Grades 1, 2, 24, and 25. In addition, as shown in FIG. 8, a pinion gear 3 combinable with the ring gear 1 was prepared using Steel Grades 1, 2, 24, and 25.

With regard to the pinion gears prepared by using Steel Grades 1 and 2 that satisfy the requirement for components in the present disclosure, the core hardness at the central portion of the tooth and the difference of a martensite ratio at the inside of a dedendum between the end portion of the tooth and the central portion of the tooth was measured in the same way as in the above-described ring gear and listed in Table 4. In each of the pinion gears made of Steel Grade 1 and Steel Grade 2 respectively, the area ratio of tempered martensite was 80% or more, and at the same time the difference of a martensite ratio was 15% or less. Furthermore, because the pinion gear is small-sized in comparison to the ring gear, the hardness of the pinion gear is slightly higher in comparison to the ring gear owing to the difference in the cooling rate after forging, nonetheless, the hardness of every pinion gears falls within a favorable range as shown in Table 4.

Figure 8:
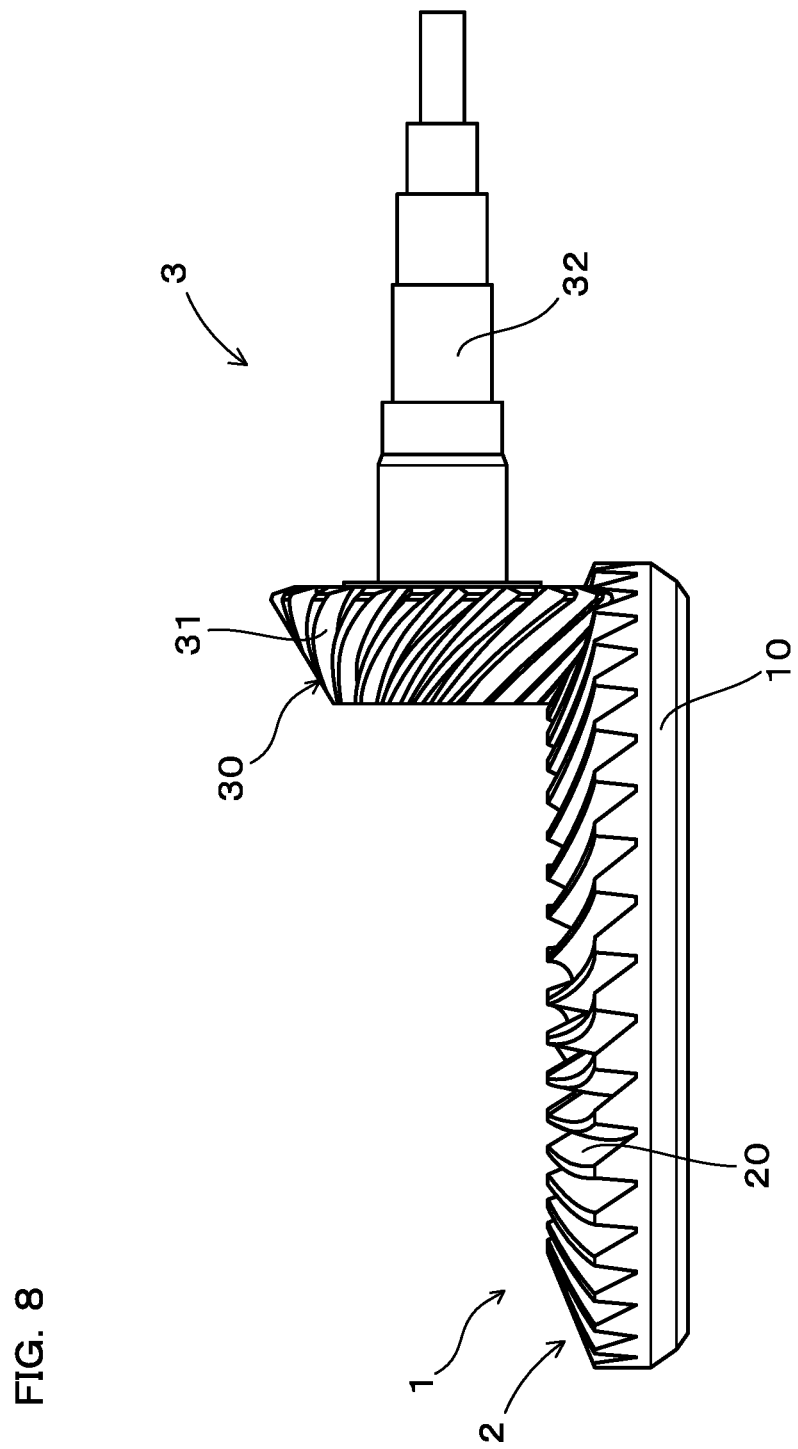
FIG. 8 is an illustration that shows the state in which the differential hypoid gear and the pinion gear are used in combination with each other in the embodiment.

The pinion gear 3, as shown in FIG. 8, is in a general shape having a tooth formation surface 30 that is provided on the end of a shaft part 32. The tooth formation surface 30 is inclined downward (backward) as departing from the center axis thereof. The tooth-forming surface 30 has a plurality of teeth 31 erected therefrom in such a manner to have the same module as that of the ring gear 1.

The differential hypoid gear (ring gear) 1 and the pinion gear 3 according to the present embodiment were prepared such that a cast piece prepared by melting in an electric furnace was subjected to forging to form into the shape of a gear, and then sequentially subjected to annealing, crude processing, gear cutting, carburization quenching and tempering, finish machining, and wrapping grinding.

<Test for Paired Hypoid Gears>

As shown in Table 4, changing the combination of the steel grades for constituting the ring gear and the pinion gear, respectively, seven kinds of tests, T1-T7 were performed. In each test, the paired hypoid gears combined as shown in FIG. 8 were rotated at a rotation speed of 50 rpm using a differential oil at a temperature of 80° C. as a lubricating oil to evaluate an extremely low cycle fatigue strength.

In each test, by drawing a T-N diagram, an evaluation was carried out on the basis of a 300 times rupture strength. In the evaluation, the rupture strength of the gears that was obtained after three-hundreds rotations in Test No. T1 was applied as a standard for judging. Here, T1 was performed using Steel Grade 24, a previously-exiting steel (SCM420) in combination for constituting a differential hypoid gear and a pinion gear in paired hypoid gears for test. In case in which the rate of improvement in rupture strength at three-hundreds rotations was 5% or more and less than 10%, symbol "Δ" was recorded. In case in which the rate of improvement at three-hundreds rotations was 10% or more and less than 20%, symbol (○) was recorded. In cases in which the rate of improvement at three-hundreds rotations was 20% or more, symbol (◎) was recorded. These symbols are shown in Table 4 together with the rate of strength increase.

It is noted that the above-mentioned T-N diagram shows a relation between a load torque T applied in the test and a rotation speed N of the hypoid gears. The test was performed by applying the torque T at a plurality of levels (the torque T was kept constant during a single test). Every rotation speed N (the number of rotations) spent until the gears got broken in each applied load torque are shown in the diagram. The evaluation in the above-described test for paired hypoid gears was carried out on the basis of the torque T when the rotation speed N was 300.

(23-27% increase) was achieved in each test. By comparing to the result in Test No. T3, it can be understood that using the steel grades including the chemical components in the above-described preferred range to prepare not only the ring gear but the pinion gear as a counter gear for use in combination with the ring gear leads to overall improvement of fatigue strength in the paired hypoid gears.

The invention claimed is:

1. A differential hypoid gear comprising:
a ring-shaped main body; and
a tooth-forming surface provided on one end surface of the ring-shaped main body in the axial direction of a center axis thereof and inclined downward as departing from the center axis, the tooth-forming surface having teeth formed thereon, wherein
the differential hypoid gear has a chemical component composition comprising C: 0.15-0.30 mass %, Si: 0.55-1.00 mass %, Mn: 0.50-1.20 mass %, Cr: 0.50-1.50 mass %, Al: 0.020-0.080 mass %, B: 0.0005-0.0050 mass %, Ti: 0.01-0.08 mass %, N: 0.0020-0.0100 mass %, Mo: 0.25 mass % or less, Nb: less than 0.10 mass %, and Fe, the chemical component composition satisfying:

$$405 \leq -684[C]-75[Mn]-22[Cr]-27[Mo]-11479[B]+680 \leq 445, \quad \text{Formula 1:}$$

TABLE 4

| Test No. | Gear Module | Steel Grade of Ring Gear | Pinion Gear | | | |
|---|---|---|---|---|---|---|
| | | | Steel Grade | Dedendum Hardness HV | Difference of Martensite Ratio between Tooth End Portion and Tooth Central Portion | Evaluation Results |
| T1 | 4.84 | Steel Grade 24 | Steel Grade 24 | — | — | Basis |
| T2 | 4.84 | Steel Grade 25 | Steel Grade 25 | — | — | Δ (6% up) |
| T3 | 4.84 | Steel Grade 1 | Steel Grade 25 | — | — | ○ (16% up) |
| T4 | 4.84 | Steel Grade 1 | Steel Grade 1 | 425 | 9 | ◎ (23% up) |
| T5 | 4.84 | Steel Grade 2 | Steel Grade 1 | 425 | 9 | ◎ (25% up) |
| T6 | 4.84 | Steel Grade 1 | Steel Grade 2 | 438 | 6 | ◎ (24% up) |
| T7 | 4.84 | Steel Grade 2 | Steel Grade 2 | 438 | 6 | ◎ (27% up) |

From the result of Test No. T2, it was clarified that when Steel Grade 25, of which the strength was enhanced by increasing the C content and the Mo content than in Steel Grade 24 to thereby increase the internal hardness within the component range of previously-existing steels, was used in both of the ring gear and the pinion gear, the extremely low cycle fatigue strength was improved to some extent in comparison to the case of Test No. T1 in which Steel Grade 24 was used for the paired hypoid gears in combination. However, since a steel material with a grain boundary strengthened by addition of B was not used, the ring gear was broken, therefore, an improvement in strength was limited to only 6% increase, which hardly reached a target level.

In Test No. T3, the pinion gear was made of Steel Grade 25 as in Test No. T2, meanwhile, the ring gear was made of Steel Grade 1 differently from Test No. T2, that includes the chemical components in the preferred range. In Test No. T3, the properties of the gears were further improved than in Test No. T2. However, unlike in Test No. T2, the pinion gear was damaged by higher strength of the ring gear, and thus rate of strength increase was unsuccessfully limited to 10% or more and less than 20% (16% increase).

With regard to Test Nos. T4-T7, the ring gear and the pinion gear were made of Steel Grade 1 or Steel Grade 2 that includes the chemical components in the preferred range, and an improvement in performance by 20% or more where [C], [Mn], [Cr], [Mo], and [B] indicate the contents (mass %) of C, Mn, Cr, Mo, and B, respectively; and $$55 \leq 536[C]+56.2[Si]-33[Mn]+20.1[Cr]-115[Mo]+6615[B]-93, \quad \text{Formula 2:}$$

where [C], [Si], [Mn], [Cr], [Mo], and [B] indicate the contents (mass %) of C, Si, Mn, Cr, Mo, and B, respectively,
the differential hypoid gear has a metallographic structure comprising mainly tempered martensite,
a martensite ratio at an inside of a dedendum of each tooth differs between an end portion of the tooth and a central portion of the tooth within a range of 15% or less, and
a core hardness of the dedendum at the central portion of the tooth falls within 350-500 HV.

2. A pinion gear, comprising a tooth-forming surface having teeth formed thereon; wherein
the pinion gear has a chemical component composition comprising C: 0.15-0.30 mass %, Si: 0.55-1.00 mass %, Mn: 0.50-1.20 mass %, Cr: 0.50-1.50 mass %, Al: 0.020-0.080 mass %, B: 0.0005-0.0050 mass %, Ti: 0.01-0.08 mass %, N: 0.0020-0.0100 mass %, Mo: 0.25 mass % or less, and Nb: less than 0.10 mass %, and Fe, the chemical component composition satisfying:

$$405 \leq -684[C]-75[Mn]-22[Cr]-27[Mo]-11479[B]+680 \leq 445, \quad \text{Formula 1:}$$

where [C], [Mn], [Cr], [Mo], and [B] indicate the contents (mass %) of C, Mn, Cr, Mo, and B, respectively; and $$55 \leq 536[C]+56.2[Si]-33[Mn]+20.1[Cr]-115[Mo]+6615[B]-93,\quad \text{Formula 2:}$$

where [C], [Si], [Mn], [Cr], [Mo], and [B] indicate the contents (mass %) of C, Si, Mn, Cr, Mo, and B, respectively, the pinion gear has a metallographic structure comprising mainly tempered martensite, a martensite ratio at an inside of a dedendum of each tooth differs between an end portion of the tooth and a central portion of the tooth within a range of 15% or less, and a core hardness of the dedendum at the central portion of the tooth falls within 350-500 HV.

3. Paired hypoid gears formed by a combination of:
a differential hypoid gear; and
the pinion gear according to claim 2,
wherein the differential hypoid gear comprises:
a ring-shaped main body; and
a tooth-forming surface provided on one end surface of the ring-shaped main body in the axial direction of a center axis thereof and inclined downward as departing from the center axis, the tooth-forming surface having teeth formed thereon, wherein the differential hypoid gear has a chemical component composition comprising C: 0.15-0.30 mass %, Si: 0.55-1.00 mass %, Mn: 0.50-1.20 mass %, Cr: 0.50-1.50 mass %, Al: 0.020-0.080 mass %, B: 0.0005-0.0050 mass %, Ti: 0.01-0.08 mass %, N: 0.0020-0.0100 mass %, Mo: 0.25 mass % or less, Nb: less than 0.10 mass %, and Fe, the chemical component composition satisfying:

$$405 \leq -684[C]-75[Mn]-22[Cr]-27[Mo]-11479[B]+680 \leq 445,\quad \text{Formula 1:}$$

where [C], [Mn], [Cr], [Mo], and [B] indicate the contents (mass %) of C, Mn, Cr, Mo, and B, respectively; and $$55 \leq 536[C]+56.2[Si]-33[Mn]+20.1[Cr]-115[Mo]+6615[B]-93,\quad \text{Formula 2:}$$

where [C], [Si], [Mn], [Cr], [Mo], and [B] indicate the contents (mass %) of C, Si, Mn, Cr, Mo, and B, respectively, the differential hypoid gear has a metallographic structure comprising mainly tempered martensite, a martensite ratio at an inside of a dedendum of each tooth differs between an end portion of the tooth and a central portion of the tooth within a range of 15% or less, and a core hardness of the dedendum at the central portion of the tooth falls within 350-500 HV.

* * * * *